(12) United States Patent
Yanase

(10) Patent No.: US 8,907,990 B2
(45) Date of Patent: Dec. 9, 2014

(54) DISPLAY SYSTEM, DISPLAY METHOD, PROGRAM, AND RECORDING MEDIUM

(76) Inventor: Takatoshi Yanase, Hyogo (JP)

( * ) Notice: Subject to any disclaimer, the term of this patent is extended or adjusted under 35 U.S.C. 154(b) by 134 days.

(21) Appl. No.: 12/935,770

(22) PCT Filed: Mar. 26, 2009

(86) PCT No.: PCT/JP2009/001356
§ 371 (c)(1),
(2), (4) Date: Sep. 30, 2010

(87) PCT Pub. No.: WO2009/122684
PCT Pub. Date: Oct. 8, 2009

(65) Prior Publication Data
US 2011/0025719 A1    Feb. 3, 2011

(30) Foreign Application Priority Data

Apr. 1, 2008   (JP) ................................. 2008-094481

(51) Int. Cl.
| | | |
|---|---|---|
| G09G 5/00 | (2006.01) | |
| G09G 5/26 | (2006.01) | |
| G06F 3/0481 | (2013.01) | |
| G06F 3/14 | (2006.01) | |
| G06F 9/44 | (2006.01) | |
| G09G 5/14 | (2006.01) | |

(52) U.S. Cl.
CPC ................ *G09G 5/26* (2013.01); *G06F 3/0481* (2013.01); *G06F 3/14* (2013.01); *G06F 9/4443* (2013.01); *G09G 5/14* (2013.01); *G09G 2340/04* (2013.01); *G09G 2340/12* (2013.01); *G09G 2370/027* (2013.01)
USPC ....................................................... 345/667

(58) Field of Classification Search
None
See application file for complete search history.

(56) References Cited

U.S. PATENT DOCUMENTS

| | | | |
|---|---|---|---|
| 5,001,697 | A | 3/1991 | Torres |
| 2003/0076340 | A1 | 4/2003 | Hatori et al. |
| 2008/0126955 | A1 | 5/2008 | Takatoshi |

FOREIGN PATENT DOCUMENTS

| | | | |
|---|---|---|---|
| EP | 1 758 019 | | 2/2007 |
| EP | 1758019 | * | 2/2007 |
| JP | 1-206430 | | 8/1989 |
| JP | 3-71191 | * | 3/1991 |
| JP | 4-51189 | * | 2/1992 |

(Continued)

OTHER PUBLICATIONS

International Search Report issued Jun. 23, 2009 in International (PCT) Application No. PCT/JP2009/001356.

*Primary Examiner* — Phi Hoang
*Assistant Examiner* — Mohammad H Akhavannik
(74) *Attorney, Agent, or Firm* — Wenderoth, Lind & Ponack, L.L.P.

(57) ABSTRACT

The multi-window system includes: a main storage unit storing display data including a display frame and a display element, a standard display frame size, and a standard text size; a display area size obtaining unit obtaining a display area size; a text size setting unit determining a text size for correcting the standard text size, based on the display area size with reference to the standard display frame size, and setting the text size to the display data as the actual text size of the text to be added to the display element; and a drawing unit generating, using the display data, the image data of the display frame and the display element added with the text having the text size, and displaying the image data in the display area by storing the image data in a display data storage unit different from the main storage unit.

15 Claims, 18 Drawing Sheets

(56) References Cited

FOREIGN PATENT DOCUMENTS

| JP | 5-313848 | 11/1993 |
|----|----------|---------|
| JP | 5-324258 | 12/1993 |
| JP | 6-236171 | 8/1994 |
| JP | 7-261724 | 10/1995 |
| JP | 7-325698 | 12/1995 |
| JP | 10-83271 | 3/1998 |
| JP | 11-24642 | 1/1999 |
| JP | 2003-108283 | 4/2003 |
| JP | 2004-152034 | 5/2004 |
| JP | 2005-196476 | 7/2005 |
| JP | 4005623 | 11/2007 |

* cited by examiner

FIG. 3

| Temporary text size | Small | Large |
|---|---|---|
| L | 16 | 32 |
| M | 12 | 24 |
| S | 8 | 16 |
| Standard window size | Width=400 | Width=800 |

FIG. 6

| Temporary text size | Standard text size |
|---|---|
| 3 | 48 |
| 2 | 36 |
| 1 | 24 |
| Standard window size (width) | 600 |

FIG. 7

| Temporary text size | Standard text size |
|---|---|
| 8 | 8 |
| 10 | 10 |
| 12 | 12 |
| 14 | 14 |
| 18 | 18 |
| 24 | 24 |
| 28 | 28 |
| 32 | 32 |
| 36 | 36 |
| 40 | 40 |
| 44 | 44 |
| 48 | 48 |
| 52 | 52 |
| Standard window size (width) | 600 |

FIG. 8

|  | Standard text size |
|---|---|
|  | 8 |
|  | 10 |
|  | 12 |
|  | 14 |
|  | 18 |
|  | 24 |
|  | 28 |
|  | 32 |
|  | 36 |
|  | 40 |
|  | 44 |
|  | 48 |
|  | 52 |
| Standard window size (width) | 600 |

FIG. 9

| Standard window size (width) | Default value of text size | Actual text size |
|---|---|---|
| 600 | 16 | |

FIG. 10

| Standard window size (width) | Text size |
|---|---|
| 600 | 16 |

FIG. 11

|  |  | Login screen | List screen | Entry screen |
|---|---|---|---|---|
| Temporary text size | 3 | 48 | 48 | 32 |
|  | 2 | 36 | 16 | 24 |
|  | 1 | 24 | 8 | 16 |

FIG. 12

|  | Login screen | List screen | Entry screen |
|---|---|---|---|
| Standard window size | 200 | 600 | 800 |

FIG. 13A

| Paired set of text sizes ||
|---|---|
| Text size | Total point |
| 8 | 0 |
| 10 | 1 |
| 12 | 2 |
| 14 | 3 |
| 16 | 4 |
| 18 | 5 |
| 20 | 6 |
| 24 | 7 |
| 32 | 8 |
| 36 | 9 |
| 40 | 10 |

FIG. 13B

| Temporary text size | Relative point |
|---|---|
| 8 | 0 |
| 10 | 1 |
| 12 | 2 |
| 14 | 3 |
| 16 | 4 |
| ... | ... |

FIG. 13C

| Width of window | Correction point |
|---|---|
| Not larger than 300 dots | 0 |
| 301 to 600 dots | 2 |
| 601 to 800 dots | 4 |
| Not smaller than 801 dots | 6 |

FIG. 14

| Example of text size generation rule ||
|---|---|
| Text size | Proportional text size |
| 8 | Not larger than 8 |
| 10 | 9~10 |
| 12 | 11~12 |
| 14 | 13~14 |
| 18 | 15~18 |
| 24 | 19~24 |
| 28 | 25~28 |
| 32 | 29~32 |
| 36 | 33~36 |
| 40 | 37~40 |
| 44 | 41~44 |
| 48 | 45~48 |
| 52 | Not smaller than 49 |

DISPLAY SYSTEM, DISPLAY METHOD, PROGRAM, AND RECORDING MEDIUM

TECHNICAL FIELD

The present invention relates to a display system and a multi-window system that can display multiple windows.

BACKGROUND ART

Each computer includes a main memory for storing a program and data directly read and written by the program, and a graphics memory for storing image data to be displayed on a display. The image data stored in the graphics memory is displayed on the display. Processes of generating image data based on display data in the main memory and displaying the image data on the display, such as a CRT and a flat display, by storing the generated image data in the graphics memory are defined as drawing or displaying processes. The graphics memory is a memory area separate from the main memory storing a running program, and stores the image data to be displayed on the display.

In each of the early personal computers and computer terminals, one display such as a cathode-ray tube had been used as one display area. The text and graphics are converted into image data and stored in a graphics memory so as to be displayed on the display.

On the other hand, multi-window systems each displaying display areas called "windows" on a single display (simply referred to as "window system") are widely available in recent personal computers and computer terminals. Each window system includes a window management unit and a program in a main memory. In the window system, a frame window as a display frame is generated by the program under control of the window management unit. Sometimes, the frame window is simply referred to as a "window".

Furthermore, a window is created by attaching, on a frame window, a display element referred to as a window component (GUI component or an object), such as a button managed by the window management unit. The frame window to which the window component is attached is also referred to as a window. The program causes a main memory to hold information of the frame window and the attached window component (hereinafter referred to as "display data"), and generates image data of the frame window and the window component using the held display data. The generated image data is stored in a graphics memory so as to be displayed on a display.

The combination of information defining a window (data structure) and a program and others (method) for generating the window is referred to as a window object. The window and the window object are in a one-to-one relationship. Once the window object generates and displays a window, it waits for instruction information from outside. The instruction information is sometimes referred to as a message. With a key input and moving and clicking of a mouse, the window object receives the message. Since the destination of the message is the window object, even when multiple windows are generated, an appropriate window object receives the message.

Upon receipt of the message by the window object, predetermined processing is performed according to details of the message. The program that executes the processing is sometimes referred to as an event processing program. Upon execution of the predetermined processing, the window object again waits for a message. With occurrence of an event, such as a key input and moving and clicking of a mouse, the window object receives the message including the event information. Upon receipt of the message, the window object only executes an event processing program that is a predetermined program corresponding to the message. Without receiving a message, the window object does nothing.

When the window object is to generate and display a window in the window system, image data of the window is not directly stored in the graphics memory in response to an instruction for drawing the window. After the window object generates the window and executes a drawing command of the window, the window management unit receives the drawing command of the window.

Upon reception of the drawing command of the window, the window management unit checks whether or not there are other windows overlapping with the window. When the windows overlap with one another, drawing messages are sequentially issued from windows under the windows. Since each window object stores image data of a window to be drawn by itself in a graphics memory on its own, there is a possibility of an influence, such as overwriting the image data of overlapping other windows. Thus, the window management unit adjusts the storage order.

When the window object receives a drawing message from the window management unit, it stores the image data of the frame window and the attached window component in a graphics memory. Thereby, the frame window and the window component are displayed on the display.

When the window object stores image data of an entire window in a graphics memory on its own without the adjustment by the window management unit, there are cases where a portion overlapping with other windows is not accurately displayed. Thus, after the window management unit adjusts the order for drawing the windows, it transmits a drawing message to each window object in the appropriate order.

Once a window is displayed, the window management unit is notified of information indicating changes in the size of a window or in a display position of a window when the size of the window is changed with a mouse operation or the display position of the window is moved. Upon receipt of the information, the window management unit adjusts the drawing order and transmits a drawing message to each window object. Upon receipt of the drawing message, the window object stores the image data of the frame window and the window component in a graphics memory. Thereby, the window is displayed on the display.

However, even when the window object executes a drawing command after a window is generated and displayed, neither the drawing message is transmitted from the window management unit to the window object nor the window is re-drawn in the current window system. This is probably derived from the basic design of the window system in which the window management unit should adjust the display of windows having changes in the overlaps. When the windows overlap and there is no change in the overlaps, the window management unit does not adjust the display. Here, when only the windows are displayed again, there is a possibility of overwriting the image data of overlapping other windows.

Furthermore, when the window object receives a drawing message from the window management unit, after the window object stores image data of a frame window and the attached window component in a graphics memory, information other than the frame window and the attached window component (hereinafter referred to as "content") can be displayed on the frame window or the image data of the attached window component using a program. Taking a browser for example, data that is not managed by the window management unit, such as text information described in HTML or an image is displayed on the frame window or the attached window component by the browser or a program incorporated into the browser.

The frame window and the window component sometimes include text information, for example, a title of a window and a name of a button. The program needs to set a size of text displayed on a frame window and a window component to the frame window and the window component in advance. When the setting of the size of text displayed on the frame window and the window component is skipped, the text size is set to a predetermined value.

Conventionally, the size of text displayed on a frame window and a window component has never be dynamically changed by a program. Because in the window system predicated on the displaying of multiple windows, a window object cannot store image data of the entire windows in a graphics memory on its own as described above. Once the image data of the windows is stored in the graphics memory, even when the text size of a frame window and of a window component in a main memory is changed, the image data in which the text size has been changed cannot be stored in the graphics memory.

Although one may assume that only the image data of the window component is stored in the graphics memory, there is a possibility that a part or the entire of the window component overlaps with other windows. Furthermore, there is another possibility that the window component overlaps with other window components on a window. Thus, solely using a method of storing the image data of the window component in the graphics memory does not work.

There are cases where display data (content) different from window components managed by the window management unit, such as text, images, and moving images is displayed on windows. A software program called a browser, such as Internet Explorer displays a content different from display elements such as window components (GUI components) managed by a window manager. The content is information such as text and images managed not by the window management unit but by a program such as a browser. A window in a browser includes a frame window and a window component managed by the window management unit, and a content managed by a program called a browser.

The size of text displayed by the browser based on information described in HTML can be changed by operating a menu. When the text size is changed by the menu operation, the browser fills a display area with a background color. Next, the browser redraws the text having the changed text size in the filled display area, so that the text size can be dynamically changed. However, the text size of the window components, such as a menu managed by the window management unit, cannot be changed by the browser.

OS/2 that is an operating system (OS) for computers has an execution environment built by a software program called a DOS-compatibility box that can execute an OS program named MS-DOS. With the DOS-compatibility box, the same screen as that of MS-DOS (DOS screen) is displayed on a window. The content displayed on the DOS screen extends and contracts according to the change in the size of a window on which the DOS screen is displayed. This results from the automatic enlargement and reduction in graphics data of a content displayed on the DOS screen.

Furthermore, with a word processor software program, the content managed by the word processor is displayed on a window. More specifically, image data in a graphics memory is filled with a background color, so that document data displayed on the window of the word processor software program is temporarily erased. After erasing the document data in the graphics memory, the text size of the document data displayed in the window is changed, and the image data of the document data is stored again in the graphics memory. As such, the text size of the document data that is a content can be changed. However, the operation is intended to change neither the text size according to the window nor the text size of a window component, but the text size of a content that is display information managed by a word processor software program.

When multiple windows are simultaneously displayed in an apparatus, such as a personal computer, the user cannot view a window under the overlapping windows. When the size of the windows is reduced, the problem of overlapping windows is solved. However, the windows reduced in size have portions that are not displayed. Thus, a larger display is needed for displaying a larger number of windows.

In recent years, apparatuses having smaller displays, such as mobile information equipment and mobile phones are used as terminals of information systems. These apparatuses have displays greatly different in size from those of personal computers. Thus, the display mechanisms of these apparatuses differ, and respectively development and maintenance of different programs have been performed for the apparatuses. Thus, the development and maintenance of systems require a lot of efforts and cost. Furthermore, the users of one information system need to learn plural operating methods for the information system. That enormously burdens the users of the information system.

Japanese Unexamined Patent Application Publication No. 6-236171 discloses a window display method of inputting a width of an area in which text is displayed, text data to be displayed, and a text size, and determining a width and a height of a window.

Japanese Unexamined Patent Application Publication No. 5-313848 discloses a method of (i) searching, in response to change in a window size with a mouse operation, a displayable font from the height and width of a window or the number of rows and columns of the window that are previously set, and (ii) changing the text size by setting the obtained font size (text size).

Japanese Unexamined Patent Application Publication No. 7-325698 discloses a method of changing a text size by calculating, in response to change in a window size performed by an operator using a keyboard or a pointing device, the height and width of text from the height and width of the window changed in size and the number of rows and columns of the window that are previously set.

Japanese Unexamined Patent Application Publication No. 5-324258 discloses a method of (i) holding text image information of one or more types of text sizes in an auxiliary storage device of a computer having a single type of a text size, (ii) storing, in a main memory, the text image information held in the auxiliary storage device, and (iii) causing an application program to display texts having different sizes.

Japanese Unexamined Patent Application Publication No. 11-24642 discloses a method of calculating a text size using the height and width and the number of rows and columns of a display area, and displaying the text screen with the calculated text size, in a computer to display text.

In other words, the conventional techniques disclose the method of determining the size of a window from text data and the text size of text to be displayed, and the method of displaying text on a screen by calculating a text size using the size of a window and the number of rows or the number of columns of text to be displayed.

Patent Reference 1: Japanese Unexamined Patent Application Publication No. 6-236171
Patent Reference 2: Japanese Unexamined Patent Application Publication No. 5-313848
Patent Reference 3: Japanese Unexamined Patent Application Publication No. 7-325698
Patent Reference 4: Japanese Unexamined Patent Application Publication No. 5-324258
Patent Reference 5: Japanese Unexamined Patent Application Publication No. 11-24642

DISCLOSURE OF INVENTION

Problems that Invention is to Solve

In view of the conventional circumstances, the object of the present invention is to provide a display system that can dynamically change the size of text to be added to a display element that is placed within a display frame and performs a predetermined operation, according to the size of the display frame.

Means to Solve the Problems

The display system according to an aspect of the present invention is a display system that is connected to a display through a display data storage unit, and displays image data in a display area on the display by storing the image data in the display data storage unit, and the system includes: a main storage unit configured to store (i) display data including a display frame, and a display element that is placed in the display frame and performs a predetermined operation, (ii) a standard display frame size that is a standard size of the display frame, and (iii) a standard text size that is a standard size of text to be added to the display element; a display area size obtaining unit configured to obtain a display area size that is an actual size of the display frame; a text size setting unit configured to determine a text size for correcting the standard text size, based on the display area size with reference to the standard display frame size, and to set the determined text size to the display data as the actual text size of the text to be added to the display element; and a drawing unit configured to generate, using the display data, the image data of the display frame and the display element added with the text having the determined text size, and to display the image data in the display area by storing the image data in a display data storage unit different from the main storage unit.

With the configuration, the text size of text to be added to each window component can be dynamically changed according to change in the window size. Here, the "display element" refers to, for example, a button, a title bar, and a status bar, and should be differentiated from a content to be displayed in the window. Taking a browser for example, the display elements include a return button and a favorite button, and the content is information described in an HTML file. Furthermore, although determining a text size "based on the display area size with reference to the standard display frame size" typically means determining the text size based on a ratio or a difference between the display area size and the standard display frame size, the present invention is not limited to this method.

Furthermore, the main storage unit is configured to hold a text size obtainment table in which each text size determined in advance based on the display area size with reference to the standard display frame size is associated one-to-one with a pair of the display area size and the standard text size, and the text size setting unit may be configured to obtain, from the text size obtainment table, the text size corresponding to the pair of the standard text size stored in the main storage unit and the display area size obtained by the display area size obtaining unit, and to set the text size to the display data.

The determination of the text size corresponding to the window size in advance can omit the calculation processes when the actual window size is changed, thus contributing to the speeding up of the processes.

Furthermore, the text size setting unit may be configured to obtain, from the text size obtainment table, the text size corresponding to the pair including a display area size that is closest to the display area size obtained by the display area size obtaining unit, and to set the text size to the display data. With the configuration, the table size can be reduced.

Furthermore, the text size setting unit may be configured to determine the text size by multiplying the standard text size by a size ratio as a determining condition of the text size, the size ratio being obtained by dividing the display area size by the standard display frame size. Since there is no need to hold the text size obtainment table and others in the main storage unit, an amount of memory can be saved. Alternatively, a value obtained by dividing the standard text size by the standard display frame size may be held in advance, and the value may be multiplied by the display area size obtained by the display area size obtaining unit. The configuration further enables speeding up of the processes.

Furthermore, the main storage unit is configured to hold a true text size obtainment table in which a plurality of text sizes to be determined by the determining condition are categorized into a plurality of groups each of which is associated with one true text size, and the text size setting unit may be configured to obtain, from the true text size obtainment table, one of the true text sizes that corresponds to the text size determined by the determining condition, and to set the one of the true text sizes to the display data. With the configuration, the table size can also be reduced.

Furthermore, after the text size setting unit sets the text size, the display area size obtaining unit may be configured to set the obtained display area size to the standard display frame size in the main storage unit, and the text size setting unit may be configured to set the determined text size to the standard text size in the main storage unit.

Furthermore, the main storage unit is configured to hold: a relative point obtainment table that holds relative points associated one-to-one with standard text sizes including the standard text size; a correction point obtainment table that holds a plurality of correction points determined in advance based on the display area size with reference to the standard display frame size; and a text size obtainment table that holds total points associated one-to-one with a plurality of the text sizes, and the text size setting unit may be configured to: obtain, from the relative point obtainment table, one of the relative points that corresponds to the standard text size stored in the main storage unit; obtain, from the correction point obtainment table, one of the correction points that corresponds to the display area size obtained by the display area size obtaining unit; add the obtained relative point and the obtained correction point to calculate a corresponding one of the total points; and obtain, from the text size obtainment table, one of the text sizes that corresponds to the calculated total point, and set the one of the text sizes to the display data.

Furthermore, the display system may operate under a multi-window system that can display multiple windows in the display area. Even under the multi-window system, the present invention is applicable to a case not only where multiple windows are displayed but also where a single window is displayed.

Furthermore, the text size setting unit may be configured to separately determine a text size for each of the windows displayed by the multi-window system. With the configuration, the optimal text size can be set to each of the windows.

Furthermore, the text size setting unit may be configured to determine the text size to be set to the display data based on the display area size of the display frame included in the display data, when new image data is generated based on the display data, the display area size being obtained by the display area size obtaining unit. Thereby, one program can be implemented by apparatuses having different display areas.

Furthermore, the text size setting unit may be configured to determine, upon change in a size of the display frame, the text size to be set to the display data based on the display area size obtained after the change by the display area size obtaining unit.

Furthermore, the text size setting unit may be configured to determine, upon reception of an instruction from a user to change the text size of the text to be added to the display element, the text size to be set to the display data based on the display area size obtained by the display area size obtaining unit.

The present invention is applicable to not only a case where a display frame (window) is newly generated but also a case where a text size is reset upon receipt of each of the events and the display frame is redrawn.

The display method according to an aspect of the present invention is a display method of displaying image data in a display area by a computer including a main storage unit that stores (i) display data including a display frame, and a display element that is placed in the display frame and performs a predetermined operation, (ii) a standard display frame size that is a standard size of the display frame, and (iii) a standard text size that is a standard size of text to be added to the display element, the image data being generated from the display data, and the method includes: obtaining a display area size that is an actual size of the display frame; determining a text size for correcting the standard text size, based on the display area size with reference to the standard display frame size, and setting the determined text size to the display data as the actual text size of the text to be added to the display element; and generating, using the display data, the image data of the display frame and the display element added with the text having the determined text size, and displaying the image data in the display area by storing the image data in a display data storage unit different from the main storage unit.

The program according to an aspect of the present invention is a program causing a computer including a main storage unit to display image data in a display area, the main storage unit storing (i) display data including a display frame, and a display element that is placed in the display frame and performs a predetermined operation, (ii) a standard display frame size that is a standard size of the display frame, and (iii) a standard text size that is a standard size of text to be added to the display element, and the image data being generated from the display data, and the program includes: obtaining a display area size that is an actual size of the display frame; determining a text size for correcting the standard text size, based on the display area size with reference to the standard display frame size, and setting the determined text size to the display data as the actual text size of the text to be added to the display element; and generating, using the display data, the image data of the display frame and the display element added with the text having the determined text size, and displaying the image data in the display area by storing the image data in a display data storage unit different from the main storage unit.

The recording medium according to an aspect of the present invention is a computer readable recording medium on which a program is recorded, the program being the aforementioned program.

The present invention can be implemented not only as a display system but also as a program causing a computer to execute functions of the display system. Obviously, such a program can be distributed through a recording medium, such as a CD-ROM and a transmission medium, such as the Internet.

A layout function is to extend and contract the size of a window component according to the size of the window. With the combination of the layout function with the technique of the present invention, both the size of the window component and the size of the text to be displayed on the window component are changed according to the window size. As a result, the display content of the GUI window can be extended and contracted according to the window size.

Furthermore, with the event processing program associated with window components, such as a button in advance, the text size of a frame window and a window component is changed according to the window size. Then, the program generates an event causing redrawing of a window by changing the appearance of the window to an extent that a human being cannot recognize the change, for example, changing the window size by several dots. With the generation of the event, the window manager adjusts the drawing order and transmits a drawing message to each window object. When the window object receives the drawing message, it stores image data of the frame window and the window component in the graphics memory. With the method, the text size can be changed according to the window size and displayed again.

According to the method, the text size is not changed each time the window size is changed, but processes for changing the text size are executed upon holding down of the button by the user, for example. Thereby, the compatibility with the conventional technique can be maintained. Furthermore, since the processing load for redrawing a window after changing the text size is heavy, the processing load can be lightened by executing the processing at the timing when the user recognizes the necessity to change the text size as described above.

The following will describe the first application in the present invention.

When multiple windows are displayed by information equipment, such as a personal computer, since windows overlap each other, the user cannot view some portions thereof and has difficulties in viewing them. Here, with the combination of the technique of the present invention with the layout function that extends and contracts the size of a window component according to the size of the window, the window size can be reduced without significantly reducing an amount of information to be displayed. As a result, the overlapping of windows can be reduced.

Thereby, the operations of switching between windows are reduced, and a terminal can be easily operated. The window component has a function of changing the text size according to the technique of the present invention, and thus changes the text size when a window is drawn or redrawn. In addition, the text size of the window component is automatically changed according to the window size of the window that is displayed again. When a window is newly displayed, the text size is automatically set according to the window size of the window for the displaying.

Next, the second application of the present invention will be described.

With the combination of the layout technique of changing the size of a window component according to the size of a screen with a programming language, such as the JAVA®, which can operate the same program even by different devices as they are, both an apparatus having a smaller display, such as mobile information equipment and a mobile phone and a terminal having a larger display, such as a personal computer can operate the same program.

Obtainment or generation of a smaller text size for an apparatus having the smaller display, such as a mobile phone and of a larger text size for a terminal having the larger display, such as a personal computer enables the use of the same program using the different apparatuses having the different displays.

Since there is no need to develop or maintain different programs for each type of a terminal, the cost for constructing and maintaining a system can be reduced. Furthermore, the user can operate different terminals in the same operating method.

Since different programs of the same application system have currently been developed for the mobile information equipment and personal computers, in many cases, different operating methods are used depending on an apparatus to be used. The user who is accustomed to operating a personal computer feels uncomfortable when operating the same program using the mobile information equipment. According to the display system in the present invention, since the same program is operated by terminals having different displays, the user has only to learn one type of the operating method.

Although many information systems in companies are predicated on the use of personal computers, with the application of the technique according to the present invention to an information system using JAVA® Applet, the system operated by a personal computer in a company can be also operated by mobile information equipment and mobile phones outside the company. Thereby, not only the development and maintenance cost of the information system can be reduced but also the work efficiency can be significantly improved.

When a document is created by a personal computer while displaying windows, the user has difficulties in operating because of the overlapping of windows. With the use of the technique of the present invention, as long as the windows to be sometimes referred to are displayed smaller, the user less frequently has difficulties in viewing the windows due to the overlapping with other windows. In other words, an amount of information to be displayed can be increased. As a result, the work efficiency can be improved.

Effects of the Invention

According to the features of the present invention, the text size of text to be displayed as a display element in the display system can be changed according to a size ranging from a predetermined size to a size corresponding to a display area or a window.

BRIEF DESCRIPTION OF DRAWINGS

FIG. 3 illustrates an example of a text size obtainment table.

FIG. 6 illustrates another example of a text size obtainment table.

FIG. 7 illustrates another example of a text size obtainment table.

FIG. 8 illustrates another example of a text size obtainment table.

FIG. 9 illustrates another example of a text size obtainment table.

FIG. 10 illustrates another example of a text size obtainment table.

FIG. 11 illustrates another example of a text size obtainment table.

FIG. 12 illustrates another example of a text size obtainment table.

FIG. 13A illustrates another example of a text size obtainment table.

FIG. 13B illustrates a relative point obtainment table.

FIG. 13C illustrates a correction point obtainment table.

FIG. 14 illustrates an example of a true text size obtainment table.

NUMERICAL REFERENCES

Figure 1:
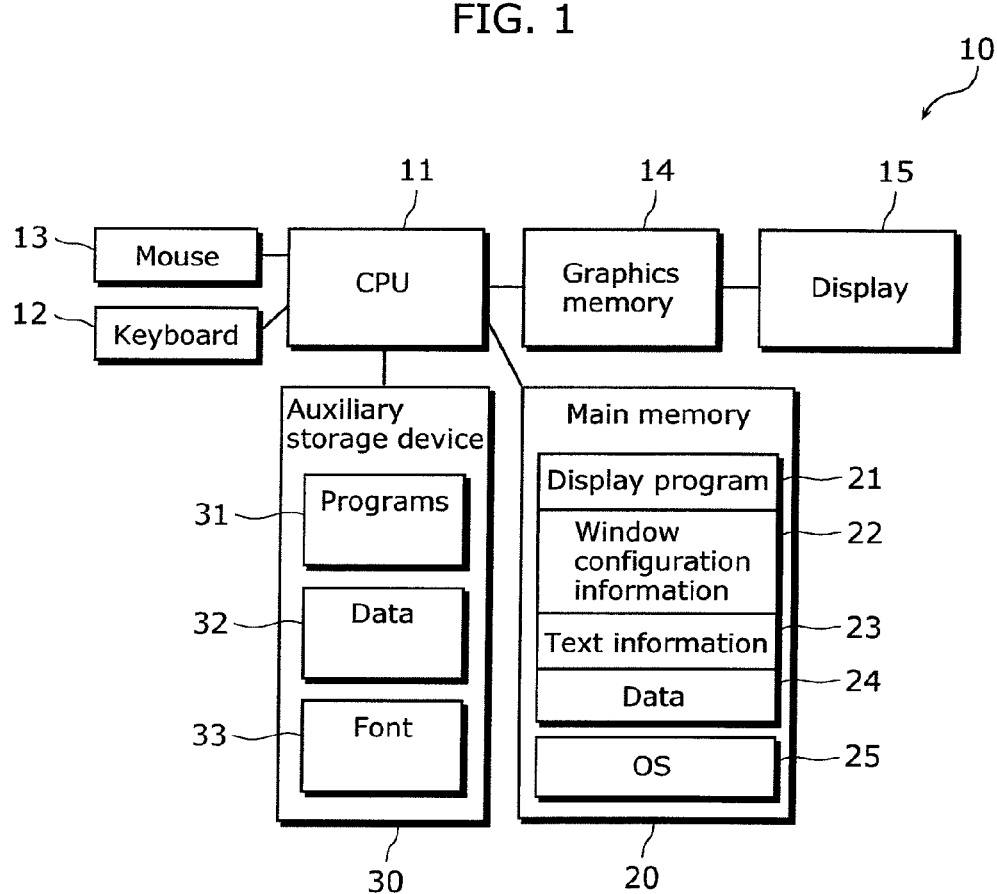
FIG. 1 illustrates a block diagram of a computer that implements a window system according to an embodiment in the present invention.

10 Computer
11 CPU
12 Keyboard
13 Mouse
14 Graphics memory
15 Display
20 Main memory
21 Display program
22 Window configuration information
23 Text information
24 Data
25 OS
30 Auxiliary storage device
31 Program
32 Data 33 Font
100 Multi-window system
101 Display area size obtaining unit
102 Text size setting unit
103 Drawing unit
110 Main storage unit
111 Display data
112 Tables
113 Standard display frame size
114 Standard text size
120 Display data storage unit

BEST MODE FOR CARRYING OUT THE
INVENTION

With reference to the drawings, an example of a preferred embodiment in the present invention will be described in detail.

FIG. 1 illustrates a configuration of a system according to the embodiment in the present invention.

A computer 10 illustrated in FIG. 1 includes a Central Processing Unit (CPU) 11 that has control over the processing in the computer 10, a keyboard 12 and a mouse 13 that function as input devices, a graphics memory 14 that functions as a display data storage unit, a display 15, a main memory 20 that functions as a main storage unit, and an auxiliary storage device 30.

The CPU 11 executes various programs loaded into the main memory 20, and are connected to the keyboard 12, the mouse 13, the graphics memory 14, the display 15, the main memory 20, and the auxiliary storage device 30 to exchange a control command and data therewith.

The graphics memory 14 is a memory area in which image data to be drawn in a display area of the display 15 is stored. The display 15 is a general display, such as a Cathode Ray Tube (CRT) and a liquid crystal display.

The main memory 20 is an area in which a program to be executed and data to be used by the program read from the auxiliary storage device 30 are stored, for example, a display program 21, window configuration information 22, text information 23, data 24, and an Operating System (OS) 25 having control over the system.

The display program 21 causes the display 15 to display a window defined by the window configuration information 22, the text information 23, the data 24, and others by, for example, writing image data of the window in the graphics memory 14.

The window configuration information 22 holds (i) display data including a frame window (display frame) and a window component (display element) such as a button, (ii) a window layout that is information indicating a position of the window component in the frame window, and (iii) a standard window size (standard display frame size) that is a standard size of the frame window. The text information 23 holds text to be added to each window component, information regarding the text, such as a font and a color, and the standard text size that is a standard size of text. The data 24 holds information necessary for operating the display program 21, for example, various tables and others to be described later.

The window configuration information 22 in a multi-window system holds the information indicating the position of the window component in the frame window. In the case where a display system is not based on the multi-window system, the window configuration information is screen configuration information. The window configuration information sometimes indicates assignment information of an absolute value indicating, on a dot unit basis, a position of a window component in vertical and horizontal directions with respect to the left corner of a window, or information of a position of a window component with respect to the adjacent window component. There are other formats of the configuration information. The configuration information is sometimes referred to as a layout. Furthermore, a function of adjusting placement of a window component on a window based on the configuration information so that image data of the window can be stored in the graphics memory is also referred to as the layout. There is another layout allowing for extending and contracting sizes of the window components according to the size of the window, adjusting a position of the window, and storing, in the graphics memory, the image data of the window in which the placement of the window component has appropriately been adjusted.

The standard window size is a standard size of a window. The text size can be changed and set according to a window size, by holding pairs of text sizes associated one-to-one with standard window sizes in advance and generating a text size according to the size of an actual window size with reference to the standard window size. When a display system is not based on the multi-window system, the standard window size is a standard display frame size.

The auxiliary storage device 30 stores various programs 31 including the display program 21, various data 32, such as a table to be described later, a font 33 of text to be added to a window component, and others.

Figure 2:
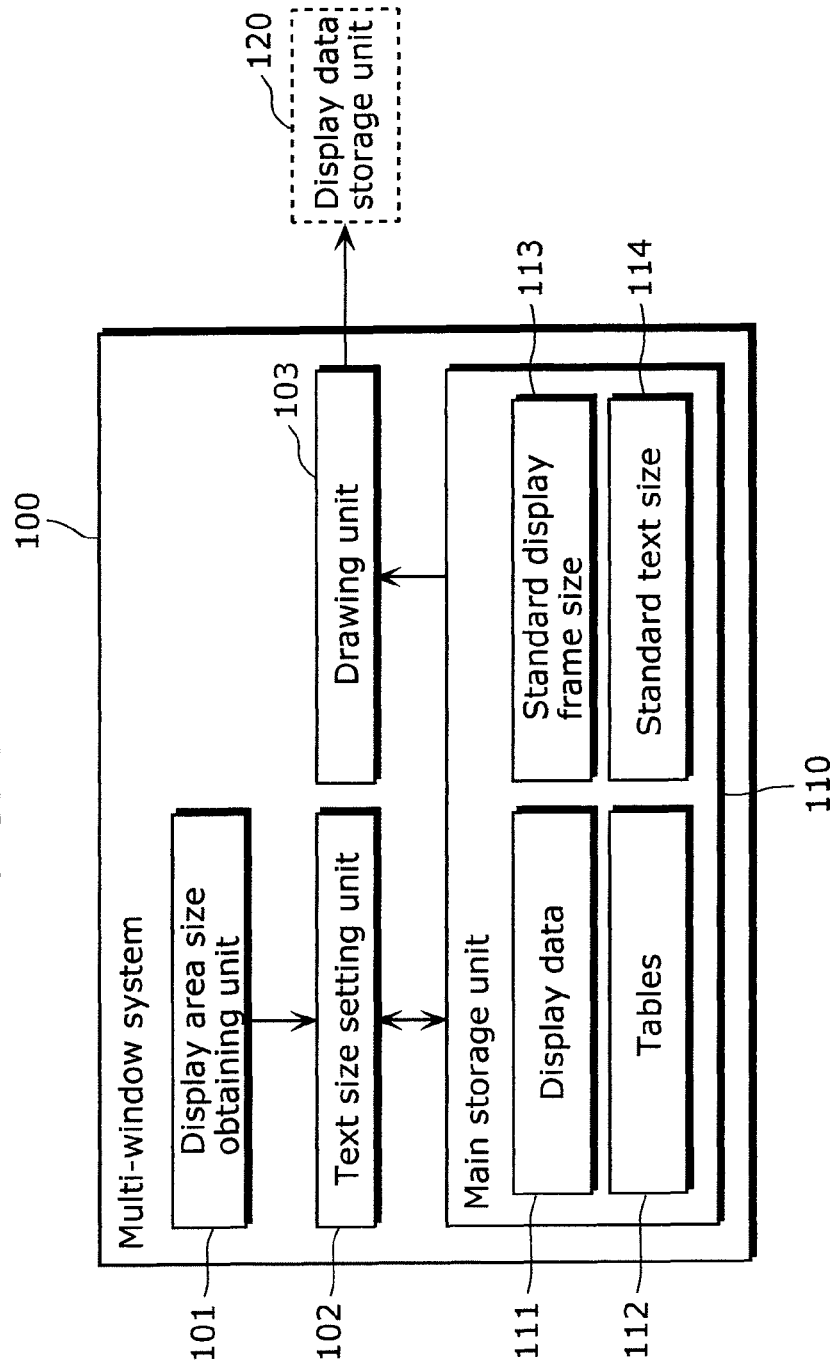
FIG. 2 illustrates a block diagram of a window system according to the embodiment in the present invention.

Next, FIG. 2 illustrates a functional block diagram of the multi-window system 100 implemented by the computer 10. The multi-window system 100 includes a display area size obtaining unit 101, a text size setting unit 102, a drawing unit 103, and a main storage unit 110. Furthermore, the main storage unit 110 stores display data 111, tables 112, a standard display frame size 113, and a standard text size 114.

When a program first displays a window and when the size of a window is changed, the display area size obtaining unit 101 obtains a display area size that is an actual size of the window (display data 111).

The text size setting unit 102 determines a text size, based on the standard display frame size 113 and the standard text size 114 that are stored in the main storage unit 110 and the display area size obtained by the display area size obtaining unit 101 under a predetermined determining condition. Then, the text size setting unit 102 sets the determined text size to the display data 111 as the actual text size of the text to be added to a display element.

The drawing unit 103 generates image data based on the display data 111, and displays the image data in a display area of the display 15 by storing the image data in a display data storage unit 120 different from the main storage unit 110.

The display data 111 stored in the main storage unit 110 includes information of a display frame (frame window) included in a window, and a display element (window component) that is placed in the display frame and performs a predetermined operation. Furthermore, the standard display frame size 113 and the standard text size 114 may be included in the display data 111.

More specifically, the display data 111 is a window object. In other words, the display data 111 holds a layout of an entire window that includes position information of a window component, the size of the window component, such as a button, text information to be added to the window component (including the text size), an event processing program set to each window component, and others.

Then, the text size setting unit 102 according to the embodiment of the present invention appropriately corrects the text size held in the display data 111 (value data representing the text size), according to the window size. Furthermore, the drawing unit 103 converts the display data 111 into image data (bit map data), and the image data is stored in the display data storage unit 120.

Here, the "display element" refers to a component included in a window, such as a button, a title bar, and a status bar, and should be differentiated from a content to be displayed in the window. Taking a browser for example, the display elements include a return button and a favorite button, and the content is information described in an HTML file.

Various tables (to be described later) to be referred to when the text size setting unit 102 determines the text size are stored in the tables 112. The standard display frame size 113 is a standard size of a display frame. The standard text size 114 is a standard size of text to be added to a display element.

The display program 21 in FIG. 1 includes methods that implement the functions of the display area size obtaining unit 101, the text size setting unit 102, and the drawing unit 103, and the CPU 11 executes the display program 21. Furthermore, the main storage unit 110 corresponds to the main memory 20 in FIG. 1. Furthermore, the display data storage unit 120 corresponds to the graphics memory 14 in FIG. 1.

Figure 4:
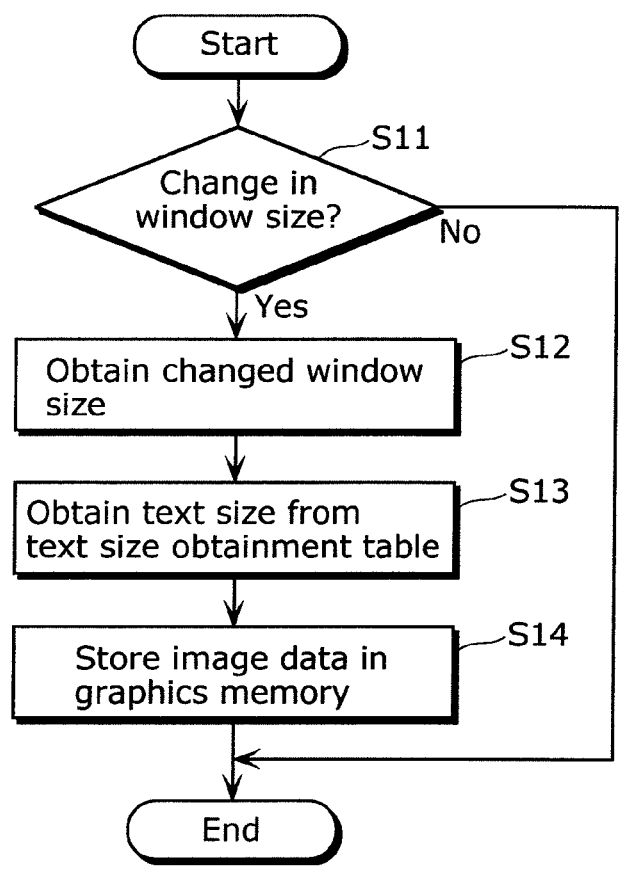
FIG. 4 shows a flowchart of an example of operations of the window system.
Figure 5:
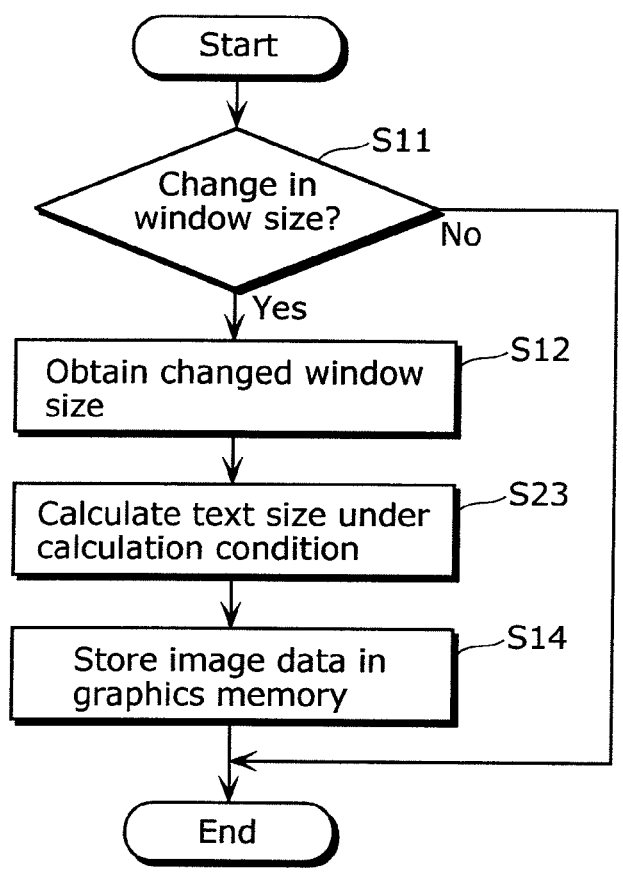
FIG. 5 shows a flowchart of another example of operations of the window system.

Next, the multi-window system 100 according to the embodiment of the present invention will be described with reference to FIGS. 3 to 5. In the following description, the multi-window system that can display multiple windows will be described as an example. Here, the multi-window system indicates a system having a function of displaying multiple windows, and does not necessarily display the multiple windows. In other words, the present invention is applicable to both a multi-window system under which only one window is displayed and a multi-window system under which multiple windows are displayed.

Furthermore, obviously, the present invention is applicable to a single window system. In such a case, the frame window should be replaced with a display frame, a window component with a display element, and a standard window size with a standard display frame size, and a window size with a display area size.

FIG. 3 shows an example of text sizes, window types, and standard window sizes that are held in advance. In this example, since the text is horizontally written, the width of a window is used as the standard window size. When the text is vertically written, the height of a window is appropriate as the standard window size. When the text is horizontally and vertically written, determining in which direction the main information is displayed will lead to appropriate display of the information. When there is no necessity of using an extremely vertically long window or an extremely horizontally long window, a product of the width and the height of a window or a length of a diagonal line may be used as the size of a window. The values indicating the size of a window herein are only examples, and thus other appropriate values may also be used.

For example, the text size obtainment table as illustrated in FIG. 3 is held in the tables 112. More specifically, available 3 types of text sizes, S, M, and L, a set of 8, 12, and 16 dots of text sizes, and a set of 16, 24, and 32 dots of text sizes are held in the table. A window having a smaller number of window components is displayed using the latter set of the larger text sizes, whereas a window having a larger number of window components is displayed using the former set of the smaller text sizes.

Furthermore, the set of text sizes to be used is designated according to a changed window size, and the text sizes of the designated set are obtained. With the designation of (i) the temporary text size (standard text size) indicating one of the S, M, and L and (ii) one of the sets of text sizes, that is, one of Large column and Small column, according to the changed window size, a text size can be obtained according to the window size. As such, the obtained text size may be set to a frame window and a window component. FIG. 4 shows a flowchart of the processing.

First, the multi-window system 100 checks whether or not the window size of a window displayed on the display 15 is changed (S11). When the multi-window system 100 detects the change in the window size (Yes in S11), the display area size obtaining unit 101 obtains the changed window size (S12).

Next, the text size setting unit 102 obtains the text size to be set to a window component whose size has been changed, from the text size obtainment table stored in the main storage unit 110, based on the window size obtained by the display area size obtaining unit 101 (S13). Then, the text size setting unit 102 sets the obtained text size to the window component in the display data 111. The processes are performed in all the window components placed in the window.

For example, when the temporary text size of the window component is set to M and the window size obtained by the display area size obtaining unit 101 is 400 pixels (hereinafter referred to as "px"), a 12-dot font is set as the text size.

Then, the drawing unit 103 generates image data from the display data 111 whose text size has been changed, and stores the image data in the display data storage unit 120 (S14). Thereby, the window defined by the display data 111 is displayed on the display 15. With the adoption of the method, the text size of a window component can be appropriately changed according to the window size.

In the actual program, the text size table in FIG. 3 is stored in a two-dimensional array. More specifically, the temporary text sizes are held in a row of the two-dimensional array, and text sizes for each set of predetermined window sizes are held in columns of the two-dimensional array, in advance. Before displaying a window, a column of the two-dimensional array is designated according to the window size, and a row is designated according to the temporary text size, the text size is obtained from the two-dimensional array, and the text size is set to a window component and to a frame window.

Each of the text sizes stored in the two-dimensional array is determined by the actual window size with reference to the standard display frame size 113. For example, each of the text sizes may be calculated by multiplying the standard text size 114 by a size ratio obtained by dividing a predetermined window size by the standard display frame size 113.

Furthermore, the text size can be changed in more detail by multiplying a standard text size by a size ratio between the obtained window size and the standard window size in FIG. 3, selecting a text size closer to the obtained value, and setting the selected text size to a window component and to a frame window.

Furthermore, a standard window size and a standard text size according to each window are held in advance, and an actual window size is obtained, so that a text size may be generated according to a size ratio between the obtained standard window size and the actual window size, with reference to the standard text size. Thereby, the text size appropriate for the actual window size can be generated, and the text size can be set to a frame window and a window component. Accordingly, the text size can be smoothly changed according to the window size. FIG. 5 shows a flowchart of processes for generating an actual text size. Here, the same reference numerals are attached to the process blocks that are included in the flowchart in FIG. 4, and the description will be omitted.

The text size setting unit 102 determines a text size based on the standard display frame size 113 and the standard text size 114 that are stored in the main storage unit 110, and the display area size obtained by the display area size obtaining unit 101 under a predetermined determining condition (S23). More specifically, the text size is calculated by multiplying the standard text size 114 by a size ratio obtained by dividing a display area size by the standard display frame size 113.

Furthermore, as illustrated in FIG. 6, by limiting the number of sets of text sizes held in advance to one, the same set of text sizes can be designated in all the windows. In FIG. 6, the text sizes obtained from the temporary text sizes are indicated by standard text sizes. Furthermore, the standard text sizes obtained from the temporary text sizes in FIG. 6 can be used as temporary text sizes. In this case, since the two columns in which the values are identical to each other are aligned as illustrated in FIG. 7, omitting one of the columns results in a table including one column as illustrated in FIG. 8.

Thus, the set of text sizes is one, so that the temporary text sizes can be identical to the standard text sizes obtained from the temporary text sizes. In this case, a pair of a default value of a text size that is the temporary text size as in FIG. 9 (corresponding to the standard text size) and the actual text size is held for each frame window and each window component, without holding any set of text sizes or holding the standard text sizes in the table of FIG. 6. The text size is set to each of the frame windows and the window components in advance as the default value.

Then, the text size may be generated according to a window size to be used as the actual text size. In this case, since the values of the standard text size and the standard window size remain unchanged, each time the window size is changed, the actual text size is generated by calculating a size ratio between the actual window size and the standard window size and multiplying the default value of the text size that is the temporary text size by the calculated size ratio. Furthermore, the processes may be performed only when a window is generated.

As illustrated in FIG. 10, only one default value of a text size that is a temporary text size (corresponding to the standard text size) can be held for each of the frame windows and the window components. Then, the actual text size is generated by calculating a size ratio between the actual window size and the standard window size and multiplying the held text size by the calculated size ratio. The generated actual text size is set to each of the frame windows and the window components.

Furthermore, after the actual text size is set according to the window size, the value of the actual window size is set to the standard display frame size 113 to change the standard display frame size 113. Similarly, the actual text size is set to the standard text size 114 to change the standard text size 114. Thereby, even when the window size is changed again, a text size can be generated according to a new window size. As described above, even when the window size is changed again, generation of the text size according to the new window size allows for execution of the first application in the present embodiment.

FIG. 11 illustrates an example of holding sets of text sizes in advance, designating one set of the text sizes according to not a window size but a type of a window, and obtaining a text size corresponding to the temporary text size, from among the designated set of the text sizes.

FIG. 12 illustrates an example of designating a standard window size according to a type of a window, generating the actual text size by multiplying a ratio between the designated standard window size and the actual window size by the temporary text size, and setting the actual text size to a frame window and a window component.

FIGS. 13A to 13C use addresses (points) each indicating a position of a temporary text size in a set of text sizes. In other words, FIGS. 13A to 13C illustrate an example of obtaining a text size from FIG. 13A using a sum of a relative point indicating a text size in the set of text sizes (FIG. 13B) and a correction point for correcting the relative point (FIG. 13C), as a total point.

Changing the correction point according to a window size changes the sum of the correction point and the relative point. Thus, the text size according to the window size can be obtained. Here, the sum indicates the temporary text size. In FIG. 13C, the correction point is assigned according to a width of a window. In the actual program, each table in FIGS. 13A to 13C is held as an array. Thus, each of the above points (relative point, correction point, and total point) indicates an address of a corresponding one of the arrays.

FIG. 13A illustrates a text size obtainment table in which actual text sizes are associated one-to-one with total points corresponding to the text sizes. Although the paired set of text sizes is limited to one in FIG. 13A, multiple paired sets may be provided. When there are the multiple paired sets, a set of text sizes is designated for one window size.

FIG. 13B illustrates a relative point obtainment table in which temporary text sizes (standard text sizes) are associated one-to-one with relative points. FIG. 13C illustrates a correction point obtainment table in which the actual text sizes are associated one-to-one with correction points. In this example, other values representing the size of a window and the type of the window may be used instead of the width of the window as a window size.

First, a correction point is obtained according to a window size from the correspondence table (FIG. 13C) of the window sizes and the correction points. Next, a relative point corresponding to a predetermined temporary text size is obtained from the correspondence table (FIG. 13B) of the temporary text sizes and the relative points.

Next, a sum of the obtained correction point (correction address) and the obtained relative point (relative address) produces a total point (real address), and the actual text size is obtained from an array including the table illustrated in FIG. 13A, using the generated total point as a key. Then, the obtained text size is set to a frame window and a window component in this example. When the obtained total point exceeds the maximum value, the maximum value is used as the total point. When the obtained total point is smaller than the minimum value, the minimum value is used as the total point.

Here, the correction points obtained from FIG. 13C are defined based on the size of a display area with reference to a standard display frame size. In other words, one correction point (for example, 2) is assigned to a pair of a standard display frame size (fixed value) and a display area size in a predetermined range (for example, 301 to 600 dots) in the correction point obtainment table in FIG. 13C

In the embodiment, addition of the correction point to the relative point obtained from FIG. 13B produces the total point, and the text size is obtained based on the total point. In other words, the text size is obtained indirectly using the size of a display area size with reference to the standard display frame size in the embodiment.

FIG. 14 illustrates an example of paired sets of text sizes held in advance, where the temporary text sizes and the standard text sizes are the same and a text size table in which temporary text sizes are associated with the actual text sizes is not used.

In this example, a size ratio between an actual text size and a standard window size is first calculated. A product of the size ratio and the standard window size held in advance produces a value as a proportional text size. Based on the proportional text size, a text size is generated in accordance with a predetermined generation rule as illustrated in FIG. 14.

The generation rule in which a proportional text size (text size) in a predetermined range is associated with the actual text size (true text size) is used in FIG. 14. The generated text size is set to a window component and a frame window.

Normally, in the case of designing and developing screens, text sizes are determined based on the actual sizes of the screens. However, with the technique according to the present invention, the temporary text sizes can be set with reference to the standard window sizes and types of windows that are basis of the designing and development phases, regardless of the actual sizes of the screens.

According to each of the aforementioned methods, the text size of text to be added to each window component can be dynamically changed according to change in the window size. For example, since there is no need to hold a text size obtainment table in the main storage unit 110 according to the method in FIG. 5, an amount of memory can be saved.

In contrast, the text size obtainment table in FIG. 3 stores the temporary text sizes (standard text sizes) in a column, and the window sizes and the actual text sizes associated one-to-one with pairs of the temporary text sizes and the window sizes in rows. In other words, designating one of the temporary text sizes (S, M, L) and one of the window sizes (400(px), 800(px)) obtained by the display area size obtaining unit 101 defines one actual text size. Each of the text sizes in the table may be calculated, for example, by multiplying the standard text size 114 by a size ratio obtained by dividing the window size at the bottom of the table by the standard display frame size 113.

In the case where the text size corresponding to the display area size that can be obtained by the display area size obtaining unit 101 is calculated in advance and is stored in a text size obtainment table, when a window size is changed, selection of the actual text size from the text size obtainment table can omit the calculation processes and contribute to the speeding up of the processes.

Although the text size obtainment table in FIG. 3 holds text sizes (columns) corresponding to the two types of display area sizes, the table may hold multiple (at least two) columns without being limited to the example in FIG. 3.

Furthermore, there are cases where the window size obtained by the display area size obtaining unit 101 is not included in a text size obtainment table. In this case, the text size may be determined using a value that is the closest to the actual window size, from among the window sizes in the text size obtainment table.

Furthermore, the table (true text size obtainment table) in FIG. 14 categorizes the text sizes (proportional text sizes) calculated by the text size setting unit 102 into groups (not larger than 8, 9 to 10, 11 to 12, . . . ) each of which includes plural text sizes (right column). Then, each of the groups is associated with one true text size (left column). With the structure, the table size of the text size obtainment table can be reduced.

Figure 15:
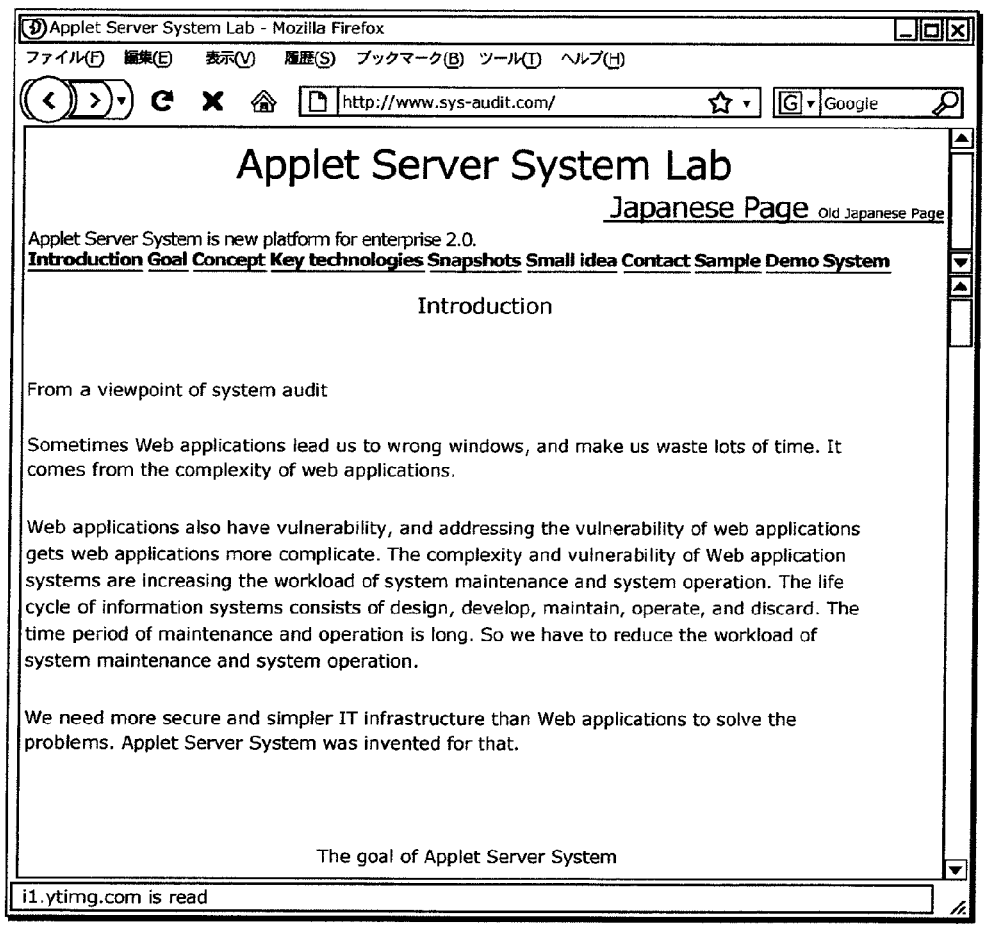
FIG. 15 illustrates a conventional browser.

FIG. 15 illustrates an example of a conventional browser. The browser includes a window made up of a frame window and window components that are managed by the window management unit, and information described in an HTML file that is a content managed by the browser in the window.

Figure 16:
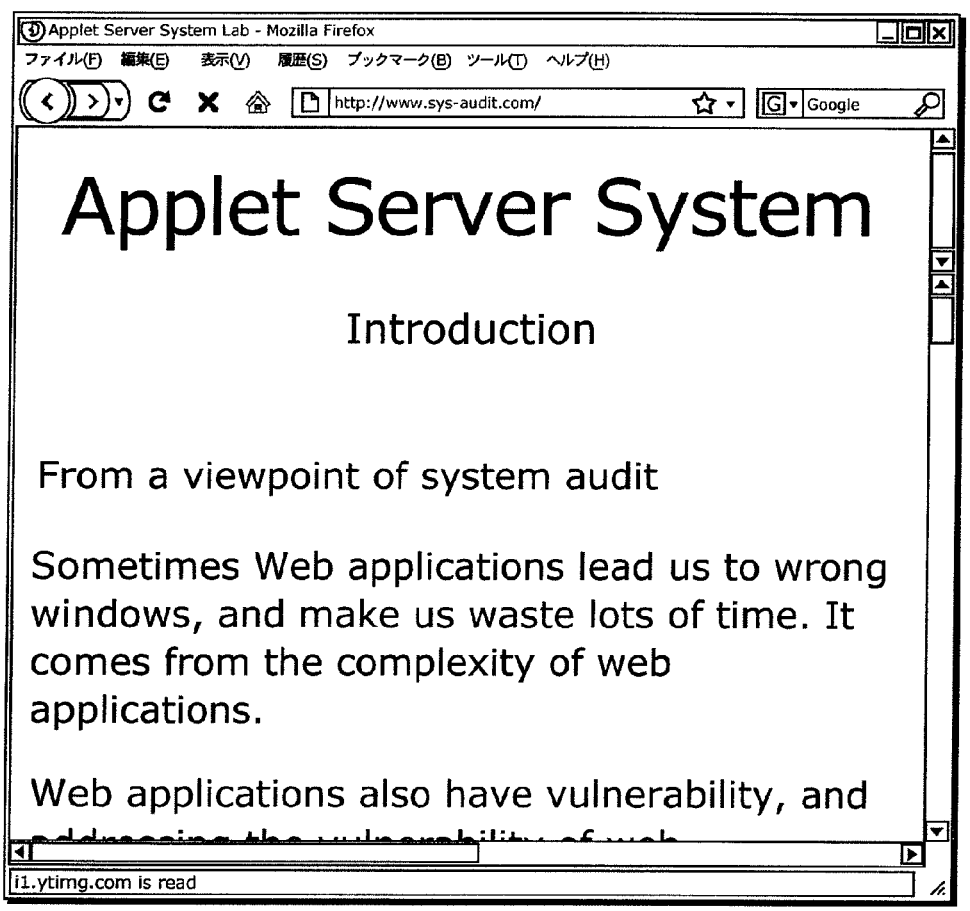
FIG. 16 illustrates a state in which the text size of a content displayed in the browser in FIG. 15 has been changed.

FIG. 16 illustrates a window in which the text size displayed by the browser is increased using a function of the browser. Although the text (content) managed and displayed by the browser becomes larger, there is no change in the text size of a frame window managed by the window management unit and in the text size of a window component. This is because once a window is displayed, the text size of text to be displayed in the frame window and in the window component conventionally cannot be changed. Although the size of the content managed by a program, such as a browser can be conventionally changed, the text size of text to be displayed in the frame window and in the window component cannot be changed.

Figure 17:
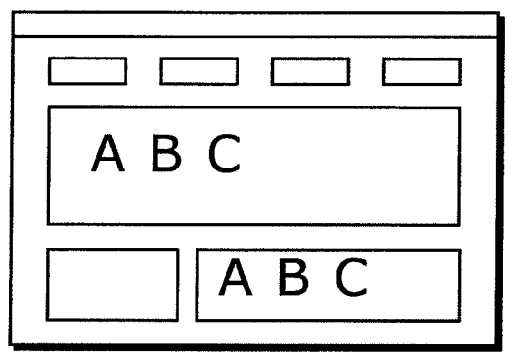
FIG. 17 is an explanatory drawing according to the embodiment of the present invention, and illustrates an example of a window having the smaller number of window components.
Figure 18:
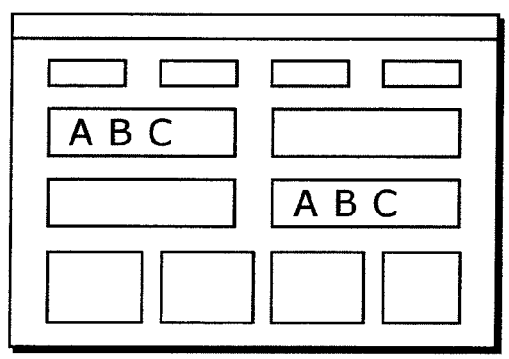
FIG. 18 is an explanatory drawing according to the embodiment of the present invention, and illustrates an example of a window having the larger number of window components.

FIGS. 17 and 18 illustrate examples of windows displayed by the multi-window system according to the embodiment of the present invention. When the number of window components placed in a frame window is smaller as illustrated in the window in FIG. 17, larger text is used. In contrast, when the number of window components placed in a frame window is larger as illustrated in the window in FIG. 18, smaller text is used.

In other words, a text size is obtained from the set of text sizes in Large column in the text size obtainment table of FIG. 3, and the obtained text size is set to the window in FIG. 17. In contrast, a text size corresponding to the temporary text size is obtained from the set of text sizes in Small column in the text size obtainment table of FIG. 3, and the obtained text size is set to the window in FIG. 18. Then, the frame windows and the window components are displayed, so that text sizes can be changed in the windows.

Figure 19:
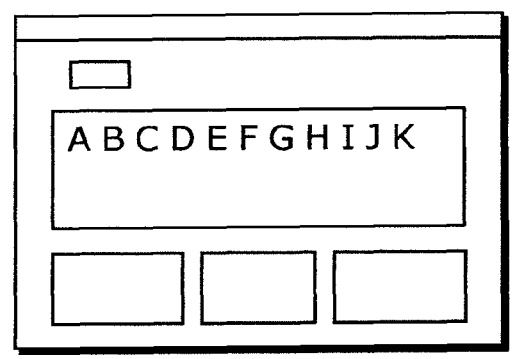
FIG. 19 illustrates a state of a window before changing the size.
Figure 20:
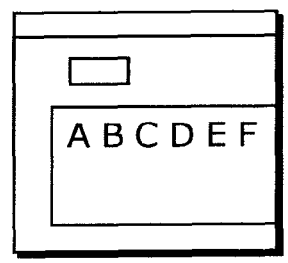
FIG. 20 illustrates a state of a window obtained by reducing the window size of the window in FIG. 19.
Figure 22:
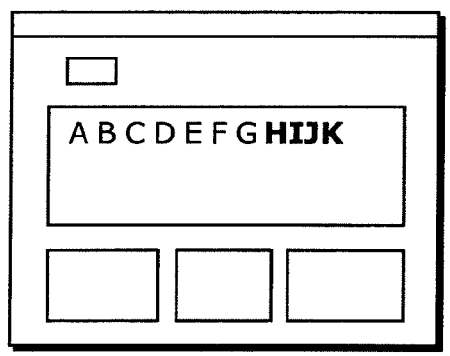
FIG. 22 illustrates a state of a window obtained by adjusting the text size of text added to one of the window components of the window in FIG. 21.

FIGS. 19 and 22 illustrate display examples of windows displayed by the multi-window system 100 according to the embodiment of the present invention when the window sizes are changed. In the window of FIG. 19, the text is displayed in the text size in Large column in FIG. 3. FIG. 20 illustrates a window obtained by reducing the window size of the window in FIG. 19 with a mouse operation. Since the sizes of the window components and the text sizes are identical to each other, only a portion of the original window of FIG. 19 is displayed in FIG. 20.

Figure 21:
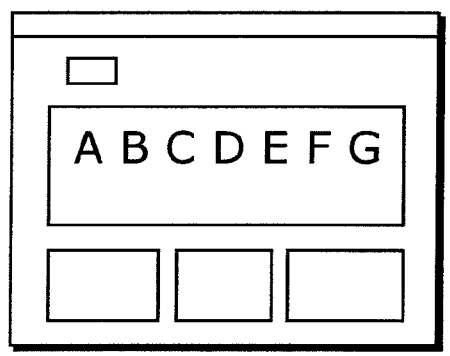
FIG. 21 illustrates a state of a window obtained by adjusting the sizes of window components according to the window size of the window in FIG. 20.

Adopting, to the window in FIG. 20, a layout capable of changing the size of a window component according to the size of a window results in the window in FIG. 21. Although the sizes of the window components become smaller, since there is no change in the text size of the text added to the window components, a portion of the text is not displayed.

FIG. 22 illustrates a re-drawn window obtained by resetting the text size of the window in FIG. 21 using the text size obtainment table in FIG. 3. As the text size becomes smaller according to the size of the window, more information is displayed in FIG. 22.

In other words, the display area size obtaining unit 101 obtains a window size after changing the window size of the window. Next, the text size setting unit 102 selects an appropriate text size from the text size obtainment table in FIG. 3 based on the standard text size 114 and the window size obtained by the display area size obtaining unit 101, and sets the selected text size to a window component. Then, the drawing unit 103 generates image data from the display data 111 of the window, and draws the window by writing the image data in the display data storage unit 120.

Next, another example of changing a text size of a window will be described hereinafter. In this example, an event processing program for activating the text size setting unit 102 is set to a button in a window. Upon holding down of the button by the user, the text size setting unit 102 is activated.

Assume that the text size designated in Large column in the text size obtainment table of FIG. 3 is set to the text in the window of FIG. 19. The change in the window size with a mouse operation results in the window in FIG. 21 from FIG. 19. Next, the button in FIG. 21 is clicked. In the event processing program that is associated with the button and is not illustrated in FIG. 21, the text size designated in Large column is reset to the text size designated in Small column in the text size obtainment table of FIG. 3. In other words, upon the user operation of "holding down of the button" (instruction of changing the text size), the text size is reset.

As described above, since a window itself is prohibited from writing image data of the entire window in a graphics memory on its own, the image data of the window whose text size has been changed is written in the graphics memory using the technique disclosed in Japanese Patent No. 4005623 (Patent Reference 6), that is, the technique of writing the image data of the entire window in the graphics memory at any time by changing the appearance of the window, such as the window size, to a extent that a human being cannot recognize the change. Writing the image data of the entire window whose text size has been changed in the graphics memory results in the change in the text size of the window.

Here, the technique disclosed in Patent Reference 6 will be briefly described. As described above, the window itself is prohibited from writing image data of the entire window in a graphics memory on its own. Thus, the technique employs a method of causing (i) the window itself to generate an event, such as changing a window size, in an event processing program, and (ii) the window management unit that receives the event to issue a drawing message of the window. Thereby, the window itself can write the image data of the entire window in the graphics memory at any time. More specifically, Patent Reference 6 enables changing one window to another window by changing the window components included in the original window before generating the event.

According to the present invention, a text size can be changed by setting a temporary text size in advance and changing the temporary text size to the actual text size in accordance with a predetermined change rule before writing image data of the entire window in a graphics memory. In other words, in the present invention, the text size can be changed according to a window size by generating the actual text size corresponding to a window in accordance with the predetermined generation rule based on a temporary text size held in advance.

Figure 23:
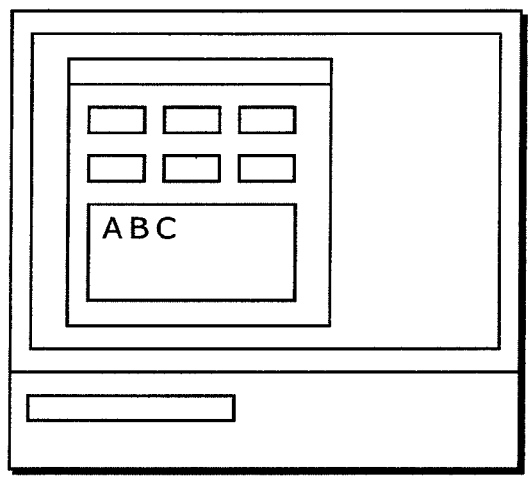
FIG. 23 illustrates an example of a computer that implements the window system according to the embodiment in the present invention.
Figure 24:
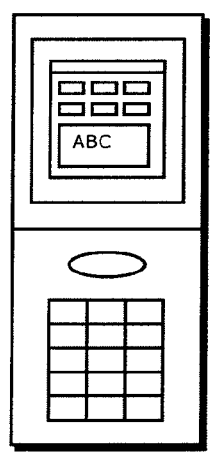
FIG. 24 illustrates an example of a mobile phone that implements the window system according to the embodiment in the present invention.

FIGS. 23 and 24 illustrate examples when the same program is operated by a personal computer and a mobile phone. The displays as illustrated in FIGS. 23 and 24 become possible with the use of the same GUI by the mobile phone and the personal computer. However, since the size of each display differs between the personal computer and the mobile phone, even when a program has been developed in JAVA®, the program cannot be operated by the personal computer and the mobile phone.

A layout capable of changing the size of a window component according to the size of a window is applied to the window. Before displaying the window, the window size or the size of the entire screen of the display is checked. Then, the text size according to the window size or the size of the entire screen is set using the text size obtainment table as in FIG. 3. Thereby, the same program can be operated by both the personal computer and the mobile phone.

In the embodiment, a button is clicked for redisplaying a window. Here, an event processing program associated with the button generates an event, such as changing the window size, after changing the text size. The event causes the window management unit to issue a drawing message.

Upon receipt of such an event, the window management unit adjusts the order of drawing windows, and transmits the drawing messages to window objects in the appropriate order. Upon receipt of the drawing messages, the window objects store the image data of the entire windows in the graphics memory, so that the windows whose text size has been changed are displayed.

In the special case where a window system for always displaying a single window due to the small size display is used, the following methods can be implemented. Since no adjustment on the order of drawing windows is necessary with the single window, when the program executes a command, image data of window components and the entire window can be stored in the graphics memory without any adjustment in the window management unit.

Furthermore, the drawing unit 103 that activates the text size setting unit and a drawing activation unit (not illustrated) may be set to a window component for performing a predetermined operation (event processing program). When the window component displayed on the window receives a predetermined instruction, that is, a predetermined message, the message triggers obtainment or generation of a text size according to the window size of the window on which the window component is displayed. When the obtained or generated text size is set to the window component, the drawing activation unit held by the window component activates the drawing unit 103.

The multi-window system according to an implementation of the present invention may be executed with a feature that the drawing unit 103 held by the window component stores, in the graphics memory, the image data of the window component whose text size has been set.

The system can hold not only a set of text sizes in an object but also the set outside the object and hold a pointer corresponding to the held set. However, the latter method of holding the set of text sizes outside the object and referring the sizes from the object is ordinary.

The text size setting unit 102 may be held in a window component, and it may be held outside the window component and called from the window component. Each of a standard display frame size obtaining unit and a display area size obtaining unit may be held in a window component, and may be held outside the window component and may be called from the window component. However, the latter method of holding it outside the object and calling it from the window component is ordinary. The drawing unit and the drawing activation unit are held in an object.

The present invention is implemented as a display system in the embodiment. However, the present invention can be implemented also as a window display method, a program, a recording medium on which the program is recorded, a program development support apparatus, an information system, a system configuration method, a server device, a client device, a telephone, and a home appliance, and various appliances.

INDUSTRIAL APPLICABILITY

The present invention is advantageously applicable to a display system.

The invention claimed is:

1. A display system that is connected to a display through a display data storage unit, and displays image data in a display area on the display by storing the image data in the display data storage unit, said display system comprising:
a main storage unit configured to store (i) display data including a display frame, and a display element that is placed in the display frame and performs a predetermined operation, (ii) a standard display frame size that is a standard size of the display frame, and (iii) a standard text size that is a standard size of text to be added to the display element, the standard display frame size and the standard text size being predetermined when designing or developing said display system;

a display area size obtaining unit configured to obtain a display area size that is an actual size of the display frame;

a text size setting unit configured to determine a text size for correcting the standard text size, based on the obtained display area size with reference to the standard display frame size, and to set the determined text size to the display data as an actual text size of the text to be added to the display element; and a drawing unit configured to generate, using the display data, the image data of the display frame and the display element added with the text having the determined text size, and to display the generated image data in the display area by storing the generated image data in the display data storage unit different from said main storage unit, wherein, when the display frame is first generated, said text size setting unit determines the text size for correcting the standard text size by enlarging or reducing the standard text size based on the obtained display area size with reference to the standard display frame size, and wherein, before a display frame added with the text having the standard size is first displayed, said drawing unit generates the image data added with the text having the text size that is determined by said text size setting unit and to which the standard text size is enlarged or reduced.

2. The display system according to claim 1, wherein said main storage unit is further configured to hold a text size obtainment table in which each text size determined in advance based on the display area size with reference to the standard display frame size is associated one-to-one with a pair of the display area size and the standard text size, and wherein said text size setting unit is configured to obtain, from the text size obtainment table, the text size corresponding to the pair of the standard text size stored in said main storage unit and the display area size obtained by said display area size obtaining unit, and to set the obtained text size to the display data.

3. The display system according to claim 2, wherein said text size setting unit is configured to obtain, from the text size obtainment table, the text size corresponding to the pair including a display area size that is closest to the display area size obtained by said display area size obtaining unit, and to set the obtained text size to the display data.

4. The display system according to claim 1, wherein said text size setting unit is configured to determine the text size by multiplying the standard text size by a size ratio as a determining condition of the text size, the size ratio being obtained by dividing the display area size by the standard display frame size.

5. The display system according to claim 4, wherein said main storage unit is further configured to hold a true text size obtainment table in which a plurality of text sizes to be determined by the determining condition are categorized into a plurality of groups each of which is associated with one true text size, and wherein said text size setting unit is configured to obtain, from the true text size obtainment table, one of the true text sizes that corresponds to the text size determined by the determining condition, and to set the obtained true text size to the display data.

6. The display system according to claim 4, wherein after said text size setting unit sets the text size:

said display area size obtaining unit is configured to set the obtained display area size to the standard display frame size in said main storage unit; and said text size setting unit is configured to set the determined text size to the standard text size in said main storage unit.

7. The display system according to claim 1, wherein said main storage unit is further configured to hold:

a relative point obtainment table that holds relative points associated one-to-one with standard text sizes including the standard text size;

a correction point obtainment table that holds a plurality of correction points determined in advance based on the display area size with reference to the standard display frame size; and a text size obtainment table that holds total points associated one-to-one with a plurality of the standard text sizes, and wherein said text size setting unit is configured to:

obtain, from the relative point obtainment table, one of the relative points that corresponds to the standard text size stored in said main storage unit;

obtain, from the correction point obtainment table, one of the correction points that corresponds to the display area size obtained by said display area size obtaining unit;

add the obtained relative point and the obtained correction point to calculate a corresponding one of the total points; and obtain, from the text size obtainment table, one of the standard text sizes that corresponds to the calculated total point, and set the obtained text size to the display data.

8. The display system according to claim 1, wherein said display system operates under a multi-window system that can display multiple windows in the display area.

9. The display system according to claim 8, wherein said text size setting unit is configured to separately determine a text size for each of the multiple windows displayed by the multi-window system.

10. The display system according to claim 1, wherein said display area size obtaining unit is configured to obtain the display area size when said drawing unit generates new image data based on the display data.

11. The display system according to claim 1, wherein said text size setting unit is configured to determine the text size to be set to the display data based on the display area size of the display frame included in the display data obtained by said display area size obtaining unit, when the image data is first generated based on the display data and the display frame to be displayed together with the image data is first displayed.

12. The display system according to claim 1, wherein said text size setting unit is configured to determine, upon a change in a size of the display frame, the text size to be set to the display data based on the display area size obtained after the change by said display area size obtaining unit.

13. The display system according to claim 1, wherein said text size setting unit is configured to determine, upon reception of an instruction from a user to change the text size of the text to be added to the display element, the text size to be set to the display data based on the display area size obtained by said display area size obtaining unit.

14. A display method of displaying image data in a display area via a display system including a computer including a main storage unit that stores (i) display data including a display frame, and a display element that is placed in the display frame and performs a predetermined operation, (ii) a standard display frame size that is a standard size of the display frame, and (iii) a standard text size that is a standard size of text to be added to the display element, the standard display frame size and the standard text size being predetermined when designing or developing the display system, the image data being generated from the display data, said display method comprising:

obtaining a display area size that is an actual size of the display frame;

determining a text size for correcting the standard text size, based on the obtained display area size with reference to the standard display frame size, and setting the determined text size to the display data as an actual text size of the text to be added to the display element; and generating, using the display data, the image data of the display frame and the display element added with the text having the determined text size, and displaying the generated image data in the display area by storing the generated image data in a display data storage unit different from the main storage unit, wherein, when the display frame is first generated, said determining of the text size determines the text size for correcting the standard text size by enlarging or reducing the standard text size based on the obtained display area size with reference to the standard display frame size, and wherein, before a display frame added with the text having the standard size is first displayed, said generating generates the image data added with the text having the text size that is determined by said determining of the text size and to which the standard text size is enlarged or reduced.

15. A non-transitory computer-readable recording medium having a program recorded thereon, the program causing a display system including a computer including a main storage unit to display image data in a display area, the main storage unit storing (i) display data including a display frame, and a display element that is placed in the display frame and performs a predetermined operation, (ii) a standard display frame size that is a standard size of the display frame, and (iii) a standard text size that is a standard size of text to be added to the display element, the standard display frame size and the standard text size being predetermined when designing or developing the display system, and the image data being generated from the display data, the program causing the computer to execute a method comprising:

obtaining a display area size that is an actual size of the display frame;

determining a text size for correcting the standard text size, based on the obtained display area size with reference to the standard display frame size, and setting the determined text size to the display data as an actual text size of the text to be added to the display element; and generating, using the display data, the image data of the display frame and the display element added with the text having the determined text size, and displaying the generated image data in the display area by storing the generated image data in a display data storage unit different from the main storage unit, wherein, when the display frame is first generated, said determining of the text size determines the text size for correcting the standard text size by enlarging or reducing the standard text size based on the obtained display area size with reference to the standard display frame size, and wherein, before a display frame added with the text having the standard size is first displayed, said generating generates the image data added with the text having the text size that is determined by said determining of the text size and to which the standard text size is enlarged or reduced.

* * * * *